(12) United States Patent
Bratkovski

(10) Patent No.: US 7,560,707 B2
(45) Date of Patent: Jul. 14, 2009

(54) APPARATUSES AND METHODS FOR UP-CONVERTING ELECTROMAGNETIC RADIATION

(75) Inventor: Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/788,446

(22) Filed: Apr. 19, 2007

(65) Prior Publication Data

US 2008/0258079 A1    Oct. 23, 2008

(51) Int. Cl.
    *G01N 21/64*    (2006.01)

(52) U.S. Cl. .................................................. 250/458.1

(58) Field of Classification Search ............... 250/458.1; 345/55
    See application file for complete search history.

(56) References Cited

U.S. PATENT DOCUMENTS

| | | | |
|---|---|---|---|
| 6,456,423 B1 * | 9/2002 | Nayfeh et al. | 359/328 |
| 6,836,494 B1 * | 12/2004 | Stuart | 372/39 |
| 2008/0048936 A1 * | 2/2008 | Powell et al. | 345/55 |

OTHER PUBLICATIONS

Scharte, M., et al., "Do Mie plasmons have a longer lifetime on resonance than off resonance?", Appl. Phys. B 73, 2001, pp. 305-310.
Fomichev, S.V., et al., "Nonlinear excitation of the Mie resonance in a laser-irradiated cluster", Optics Express, vol. 11, No. 19, 2003, pp. 2433-2439.
Teperik, Tatiana V., et al., "Mie plasmon enhanced diffraction of light from nanoporous metal surfaces", Optics Express, vol. 14, No. 25, 2006, pp. 11964-11971.

* cited by examiner

*Primary Examiner*—Constantine Hannaher

(57) ABSTRACT

As disclosed herein, a plasmonic up-converter apparatus includes an excitation source operable to emit electromagnetic radiation at an excitation frequency and at least one array of nanofeatures. The at least one array of nanofeatures is configured to produce an emission spectrum responsive to irradiation by the electromagnetic radiation. The emission spectrum has an intensity at a second harmonic frequency or a third harmonic frequency approximately equal to an intensity at a fundamental harmonic frequency, with the fundamental harmonic frequency being approximately equal to the excitation frequency. Additional aspects are directed to a display that utilizes any of the disclosed plasmonic up-converter apparatuses, a laser in which a laser medium is optically pumped using electromagnetic radiation produced by one of the disclosed plasmonic up-converter apparatuses, and methods of up-converting electromagnetic radiation.

20 Claims, 12 Drawing Sheets

APPARATUSES AND METHODS FOR UP-CONVERTING ELECTROMAGNETIC RADIATION

TECHNICAL FIELD

Embodiments of the present invention relate generally to apparatuses and methods for up-converting electromagnetic radiation. More particularly, embodiments of the present invention relate to a plasmonic up-converter apparatus including at least one array of nanofeatures.

BACKGROUND

Up-conversion materials are utilized in a number of different technologies. Generally described, an up-conversion material converts electromagnetic radiation at a first frequency to electromagnetic radiation having one or more higher frequencies. Up-conversion materials may be employed in displays, image-capture devices, infrared detectors, and optical communication systems.

The use of up-conversion materials capable of converting infrared electromagnetic radiation generated by inexpensive, infrared laser diodes is considered a promising approach for replacing bulky, cathode-ray-tube ("CRT") displays and other displays, such as flat-panel displays and liquid-crystal displays ("LCDs"). For example, a display may include a transparent display screen having an array of up-conversion materials coating the screen. Each of the up-conversion materials is operable to emit visible electromagnetic radiation responsive to irradiation by infrared electromagnetic radiation from an infrared laser diode. A collimated, infrared beam is scanned to selectively irradiate and address the individual up-conversion materials. The up-conversion materials emit visible electromagnetic radiation responsive to being addressed by the infrared beam to form an image.

Different approaches for color displays and projection TVs are being considered in which multiple up-conversion materials define individual RGB triads. Each up-conversion material of an RGB triad emits red-, green-, or blue-colored light responsive to infrared electromagnetic radiation. In such an approach, a color image can be generated by controlling the intensity of the red-, green-, and blue-colored light emitted from the up-conversion materials of the RGB triads.

Although the use of an infrared excitation source in combination with up-conversion materials is considered a promising technology, efficiency of conventional up-conversion materials can still be undesirably inefficient. Many conventional up-conversion materials, such as lithium niobate, only up-convert about 1.5 percent of the infrared excitation radiation to visible light.

Accordingly, designers and manufacturers of up-conversion materials, apparatuses, and displays continue to seek more efficient up-conversion techniques capable of converting non-visible electromagnetic radiation to higher frequency electromagnetic radiation for use in displays, projection TVs, and a multitude of other applications, such as subwavelength lithography.

SUMMARY

Various aspects of the present invention are directed to apparatuses and methods for up-converting electromagnetic radiation. In one aspect of the present invention, a plasmonic up-converter apparatus includes an excitation source operable to emit electromagnetic radiation at an excitation frequency and at least one array of nanofeatures. The at least one array of nanofeatures is configured to produce an emission spectrum responsive to irradiation by the electromagnetic radiation. The emission spectrum has an intensity at a second harmonic frequency or a third harmonic frequency approximately equal to an intensity at a fundamental harmonic frequency, with the fundamental harmonic frequency being approximately equal to the excitation frequency.

Another aspect of the present invention is directed to a method of up-converting excitation electromagnetic radiation at an excitation frequency. The method includes irradiating at least one array of nanofeatures with the excitation electromagnetic radiation and emitting electromagnetic radiation from the at least one array responsive to irradiating the at least one array. The electromagnetic radiation has an emission spectrum exhibiting an intensity at a second harmonic frequency or a third harmonic frequency that is approximately equal to an intensity at a fundamental harmonic frequency, with the fundamental harmonic frequency being approximately equal to the excitation frequency.

Yet another aspect of the present invention is directed to a display that utilizes any of the disclosed plasmonic up-converter apparatuses for producing visible light. A further aspect of the present invention is directed to a laser in which a laser medium is optically pumped using electromagnetic radiation produced by one of the disclosed plasmonic up-converter apparatuses.

BRIEF DESCRIPTION OF THE DRAWINGS

The drawings illustrate various embodiments of the present invention, wherein like reference numerals refer to like elements or features in different views or embodiments shown in the drawings.

DETAILED DESCRIPTION OF VARIOUS EMBODIMENTS

Various embodiments of the present invention are directed to apparatuses and methods for up-converting electromagnetic radiation ("EMR"). The disclosed plasmonic up-converter apparatuses include at least one periodic array of nanofeatures configured to up-convert EMR at, for example, an infrared frequency to EMR having a frequency within the visible (about $4\times10^{14}$ Hz to about $7.5\times10^{14}$ Hz) or soft ultraviolet frequency range (about $7.5\times10^{14}$ Hz to about $1\times10^{15}$ Hz). The nanofeatures are designed with a selected Mie resonance frequency, which determines a magnitude of a second or third harmonic frequency of an emission spectrum of EMR scattered from the at least one periodic array responsive to irradiation by excitation EMR. As used herein, the term nanofeature includes a nanoparticle or a nanohole.

Figure 1A:
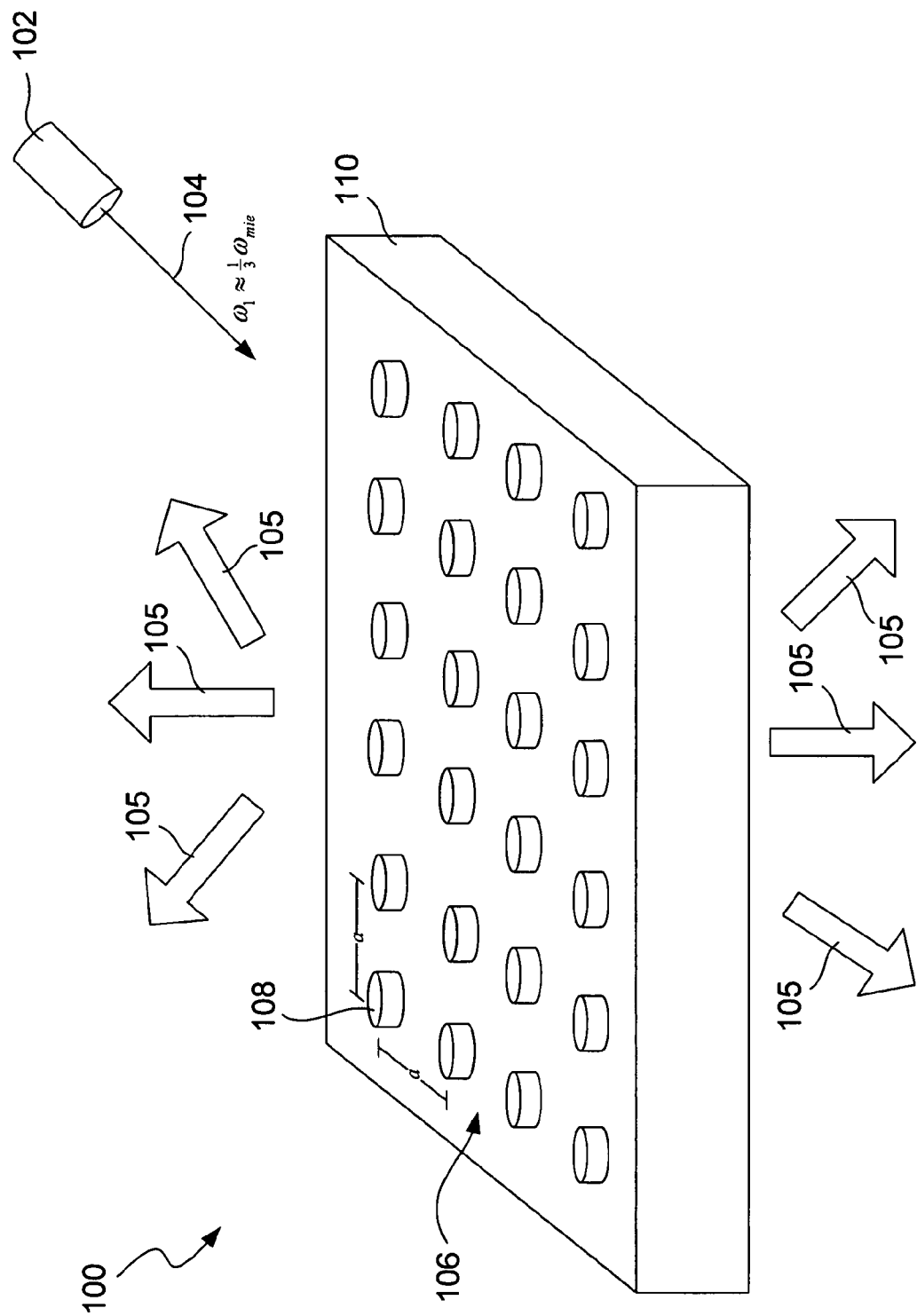
FIG. 1A is a schematic isometric view of a plasmonic up-converter apparatus including a periodic array of nanoparticles according to one embodiment of the present invention.
Figure 1B:
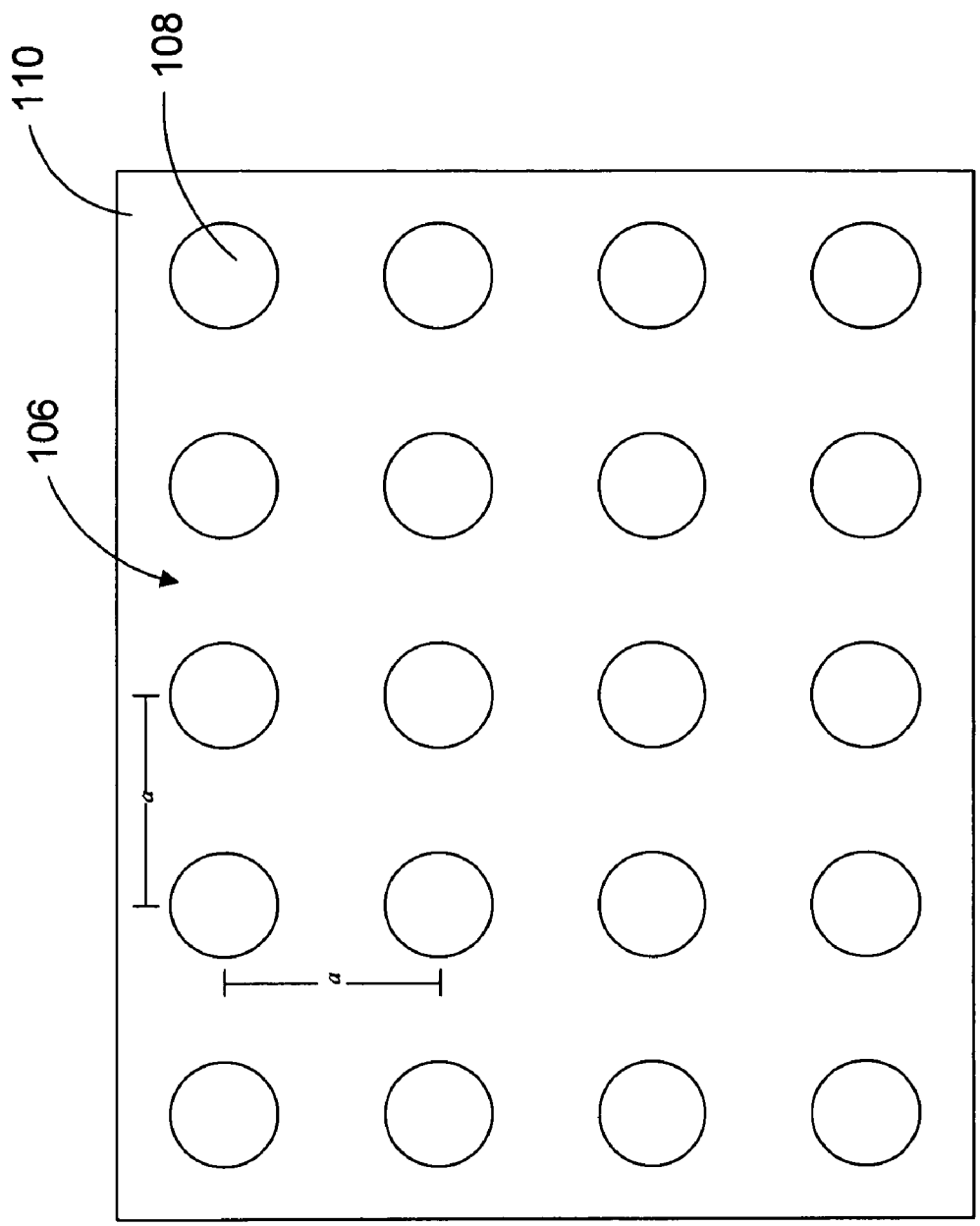
FIG. 1B is a schematic plan view of the periodic array of nanoparticles shown in FIG. 1A.

FIGS. 1A and 1B show a plasmonic up-converter apparatus 100 according to one embodiment of the present invention. The plasmonic up-converter apparatus 100 includes an excitation EMR source 102 operable to emit EMR 104 at a selected frequency $\omega_1$ or range of frequencies. The EMR source 102 may be an infrared light emitting diode ("LED") or an infrared laser diode configured to emit EMR with a frequency of about $3\times10^{-3}$ Hz to about $4\times10^{14}$ Hz.

The plasmonic up-converter apparatus 100 further includes a periodic array 106 of electrically conductive nanoparticles 108 configured to produce an emission spectrum 105 of EMR that is scattered generally isotropically from the periodic array 106 responsive to irradiation by the EMR 104. The periodic array 106 is configured to up-convert the EMR 104 to EMR at one or more higher frequencies. As will be discussed in more detail below, each of the nanoparticles 106 is designed with a selected Mie resonance frequency $\omega_{mie}$, which determines a magnitude of a third harmonic frequency $\omega_3$ of the emission spectrum 105. Additionally, the excitation frequency $\omega_1$ is selected to be approximately equal to one-third of the selected Mie resonance frequency $\omega_{mie}$.

The periodic array 106 of the nanoparticles 108 forms a two-dimensional periodic structure. In the illustrated embodiment, the nanoparticles 108 are arranged in a square lattice having a lattice constant $\alpha$. However, other periodic arrangements may be used. For example, the nanoparticles 108 may be distributed in a triangular periodic arrangement or another arrangement designed so that the emission spectrum 105 is scattered generally isotropically. Representative sizes for each of the nanoparticles 106 is about 2 nm to about 200 nm, and the lattice constant $\alpha$ is generally less than the wavelength of the EMR 104 emitted from the EMR source 102. Each of the nanoparticles 108 may have a spherical shape, elliptical shape, rectangular shape, or other shape with a center of inversion. As will be discussed in more detail below with respect to the emission spectrum shown in FIG. 3, when the nanoparticles 108 have a center of inversion, the intensity of EMR emitted at the third harmonic frequency $\omega_3$ from the periodic array 106 responsive to irradiation with EMR at the frequency $\omega_1$ is enhanced and is approximately equal to EMR emitted from the periodic array 106 at the fundamental harmonic frequency $\omega_1$.

The nanoparticles 108 of the periodic array 106 may be formed on a substrate 110, such as a glass substrate or a single-crystal silicon substrate. The nanoparticles 108 may be formed by depositing a layer of electrically conductive material on the substrate 110, followed by defining the nanoparticles 108 from the layer using nanoimprint lithography, electron-beam lithography, focused-ion-beam milling, or another suitable selective material removal technique. Each of the nanoparticles 108 may be formed from a number of different electrically conductive materials, such as gold, silver, platinum, palladium, aluminum, copper, alloys of any of the preceding metals, or heavily-doped semiconductors (e.g., silicon, germanium, compound semiconductors).

Figure 2A:
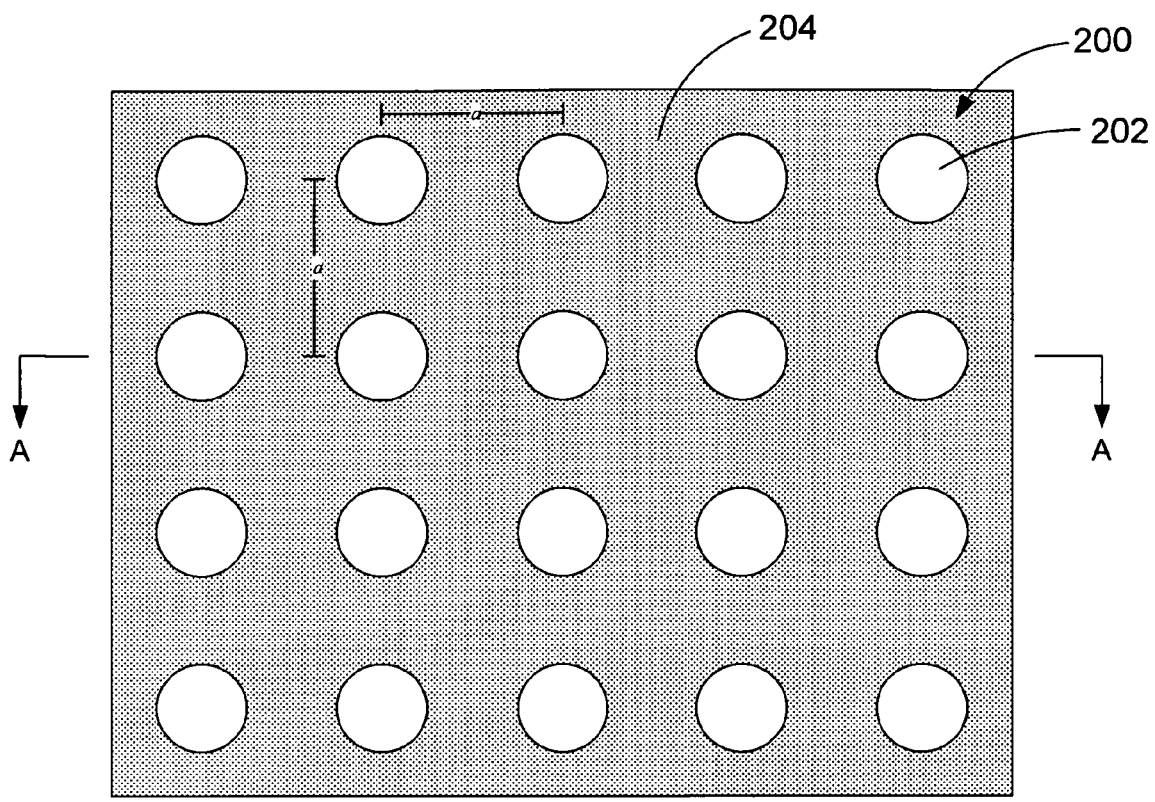
FIG. 2A is a schematic plan view of a periodic array of nanoholes according to another embodiment of the present invention.
Figure 2B:
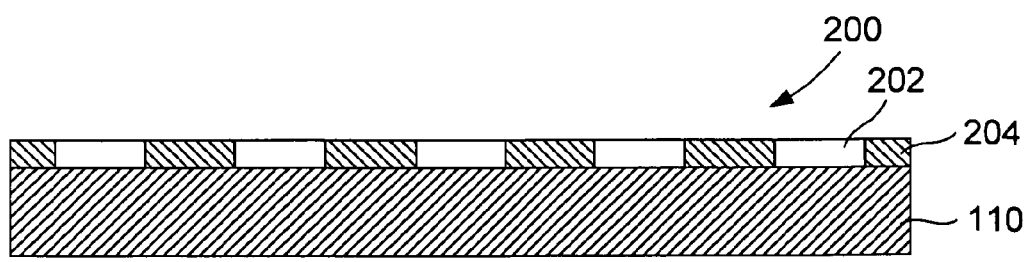
FIG. 2B is a schematic cross-sectional view of the periodic array shown in FIG. 2A taken along line A-A.

FIGS. 2A and 2B show a periodic array 200 of nanoholes 202 for use in a plasmonic up-converter apparatus according to another embodiment of the present invention. The nanoholes 202 of the periodic array 200 are formed in a layer 204 and may extend completely, as illustrated, or partially through the thickness of the layer 204. In the illustrated embodiment, the nanoholes 202 are arranged in a square lattice having a lattice constant a, where a is generally less than the wavelength of the EMR 104 that irradiates the periodic array 200. However, other periodic arrangements may be employed in which the nanoholes 202 are distributed so that the EMR scattered therefrom is scattered generally isotropically. The layer 204 may be formed from the same electrically conductive materials as the nanoparticles 108. For example, the layer 204 may be deposited on the substrate 110 and the nanoholes 202 formed in the layer 204 using any of the previously described selective material removal methods. As with the periodic array 106 of the nanoparticles 108 shown in FIGS. 1A and 1B, each of the nanoholes 202 may have a circular shape, elliptical shape, rectangular shape, or other shape with a center of inversion so that an intensity of the third harmonic frequency of an emission spectrum emitted from the periodic array 200 responsive to irradiation with EMR at the fundamental harmonic frequency is about equal to an intensity at the fundamental harmonic frequency $\omega_1$.

Figure 3:
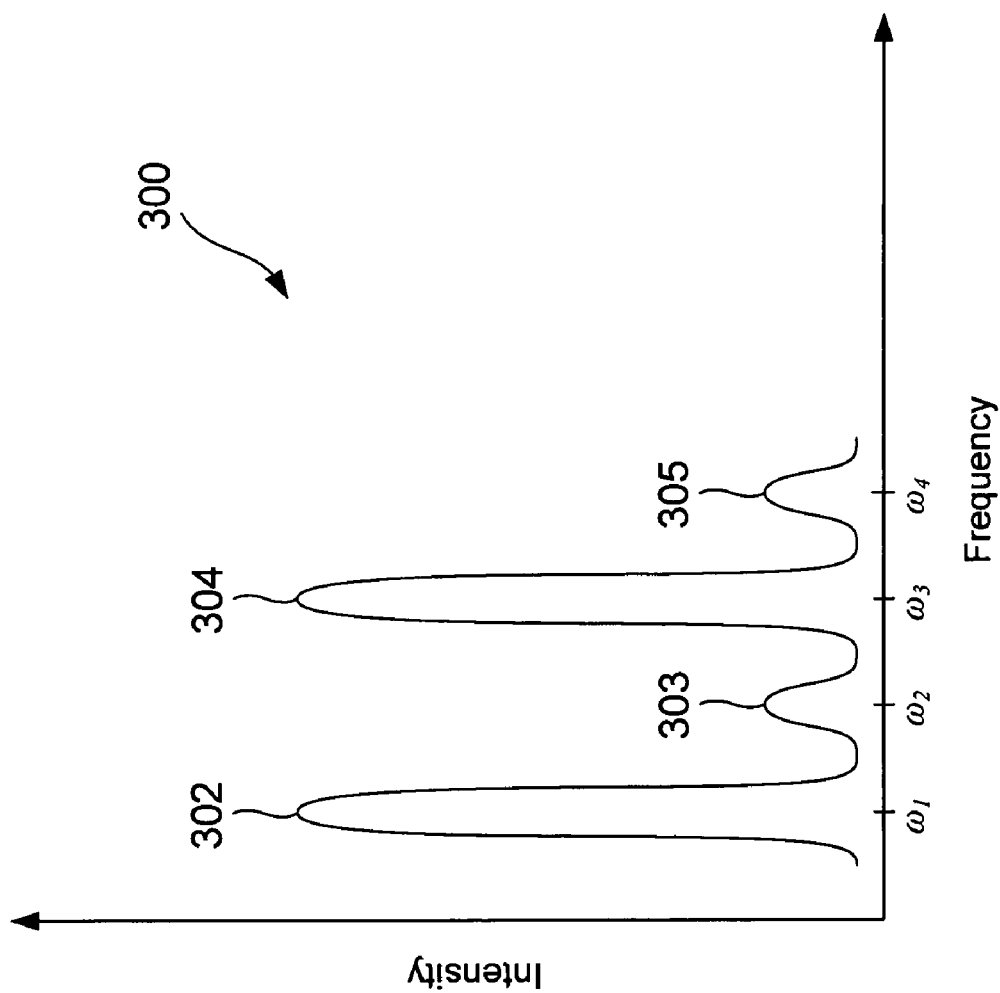
FIG. 3 is an example of an emission spectrum from one of the periodic arrays shown in FIGS. 1A through 2B in which an intensity of the third harmonic frequency is approximately equal to an intensity of a fundamental harmonic frequency.

FIG. 3 shows an emission spectrum 300 generated during operation of a plasmonic up-converter apparatus, such as the plasmonic up-converter apparatus 100 shown in FIGS. 1A and 1B. Irradiating either the periodic array 106 shown in FIGS. 1A-1B or the periodic array 200 shown in FIGS. 2A-2B with EMR at the excitation frequency $\omega_1$ produces the EMR emission spectrum 300 with a number of different EMR emission peaks at different harmonic frequencies. The EMR of the emission spectrum 300 is scattered generally isotropically from the periodic array 106 or 200. Accordingly, when the substrate 110 shown in FIGS. 1A-1B and 2A-2B is optically transparent to some or all of the EMR of the emission spectrum 300, at least a portion of the EMR may also be transmitted through the substrate 110.

As shown in FIG. 3, irradiation of either the periodic array 106 or the periodic array 200 with EMR at the excitation frequency $\omega_1$ produces an EMR emission peak 302 at a fundamental harmonic frequency approximately equal to the excitation frequency $\omega_1$, an EMR emission peak. 303 at a second harmonic frequency $\omega_2$, an EMR emission peak 304 at a third harmonic frequency $\omega_3$, and an EMR emission peak 305 at a fourth harmonic frequency $\omega_4$. The second harmonic frequency has a magnitude $2\omega_1$, the third harmonic frequency has a magnitude $3\omega_1$, and the fourth harmonic frequency has a magnitude $4\omega_1$. There are many additional EMR emission peaks at higher-order harmonic frequencies having a magnitude $n\omega_1$, where n is an integer, but the intensity of the EMR emission peaks at the higher-order harmonic frequencies above the third harmonic frequency typically have a relatively lower intensity compared to intensity of the EMR emission at the fundamental harmonic frequency and the third harmonic frequency.

It is noted that the second harmonic frequency $\omega_2$ and the third harmonic frequency $\omega_3$ have a frequency greater than that of the fundamental harmonic frequency $\omega_1$. Thus, the EMR at the excitation frequency $\omega_1$ is up-converted by irradiating either the periodic array 106 or the periodic array 200 with infrared or near infrared EMR in order to emit therefrom EMR at higher frequencies that fall within the visible or soft ultraviolet frequency range. For example, the third harmonic frequency $\omega_3$ may have a value in the visible or soft ultraviolet frequency range. Additionally, the intensity of the EMR emission at the third harmonic frequency $\omega_3$ is approximately equal to the intensity of the EMR emission at the fundamental harmonic frequency $\omega_1$. Thus, in certain embodiments of the present invention about forty percent to about fifty percent of the excitation EMR may be up-converted to EMR at the third harmonic frequency $\omega_3$.

The configuration of an individual nanofeature of, for example, the periodic array 106 shown in FIGS. 1A-1B and the periodic array 200 shown in FIGS. 2A-2B generally controls the value of the third harmonic frequency $\omega_3$ of the emission spectrum 300. Thus, the third harmonic frequency $\omega_3$ may be predicted using Mie scattering theory for an individual nanofeature. According to Mie scattering theory, the Mie resonance frequency for an individual nanofeature is equal to:

$$\omega_{mie} = \frac{\omega_p}{\sqrt{\varepsilon_{nf} - (1 - A^{-1}) \cdot \varepsilon_{matrix}}}$$

where $\omega_{mie}$ is the Mie resonance frequency, $\omega_p$ is the bulk plasmon frequency of one of the nanofeatures (i.e., a single nanoparticle 108 or nanohole 302), $\varepsilon_{nf}$ is the dielectric constant for the nanofeature (i.e., a single nanoparticle 108 or nanohole 202), $\varepsilon_m$ is the dielectric constant for the medium surrounding the nanofeature (i.e., the substrate 110 or the layer 204), and A is a depolarization factor that is dependent on the geometry of the nanofeature (i.e., the geometry of a single nanoparticle 108 or nanohole 202). The Mie resonance frequency $\omega_{mie}$ is a function of the shape and composition of an individual nanofeature, and the medium surrounding the single nanofeature. The Mie resonance frequency $\omega_{mie}$ is the frequency of EMR that excites collective electronic oscillations, which can be interpreted as a displacement of the center of mass of all electrons in, for example, the nanoparticle 108 against the positively charged background of atomic cores.

For a periodic array of nanofeatures in which the nanofeatures exhibit a center of inversion (e.g., nanoparticles 108 and nanoholes 202), the third harmonic frequency $\omega_3$ of the emission spectrum 300 is approximately equal to the Mie resonance frequency $\omega_{mie}$. Thus, the value of the third harmonic frequency $\omega_3$ may be selected to fall within the visible or soft ultraviolet frequency range by proper selection of the materials and geometry for an individual nanofeature and calculating the Mie resonance frequency $\omega_{mie}$ for the single nanofeature. Consequently, the excitation frequency $\omega_1$ is selected to be approximately equal to one-third of the Mie resonance frequency $\omega_{mie}$ for an individual nanofeature.

It should be noted that the collective interaction between adjacent nanofeatures contributes to increasing the intensity at the third harmonic frequency $\omega_3$ more than would be apparent in an individual nanofeature. Thus, while Mie scattering theory for an individual nanoparticle or nanohole provides a design rule for determining the third harmonic frequency $\omega_3$ for an array of nanoparticles or nanoholes that exhibit a center of inversion, the periodic arrangement of the nanofeatures also enhances the intensity at the third harmonic frequency $\omega_3$.

As discussed above, the nanoparticles 108 and the nanoholes 202 exhibit a center of inversion so that the emission spectrum from a periodic array of such nanofeatures exhibits EMR at a third harmonic frequency $\omega_3$ with an intensity that is approximately equal to the intensity of EMR emitted at a fundamental harmonic frequency $\omega_1$. By forming individual nanofeatures of a periodic array without a center of inversion, an emission spectrum from the periodic array exhibits EMR at a second harmonic frequency $\omega_2$ with an intensity that is approximately equal to the intensity of EMR emitted at a fundamental harmonic frequency $\omega_1$.

Figure 4:
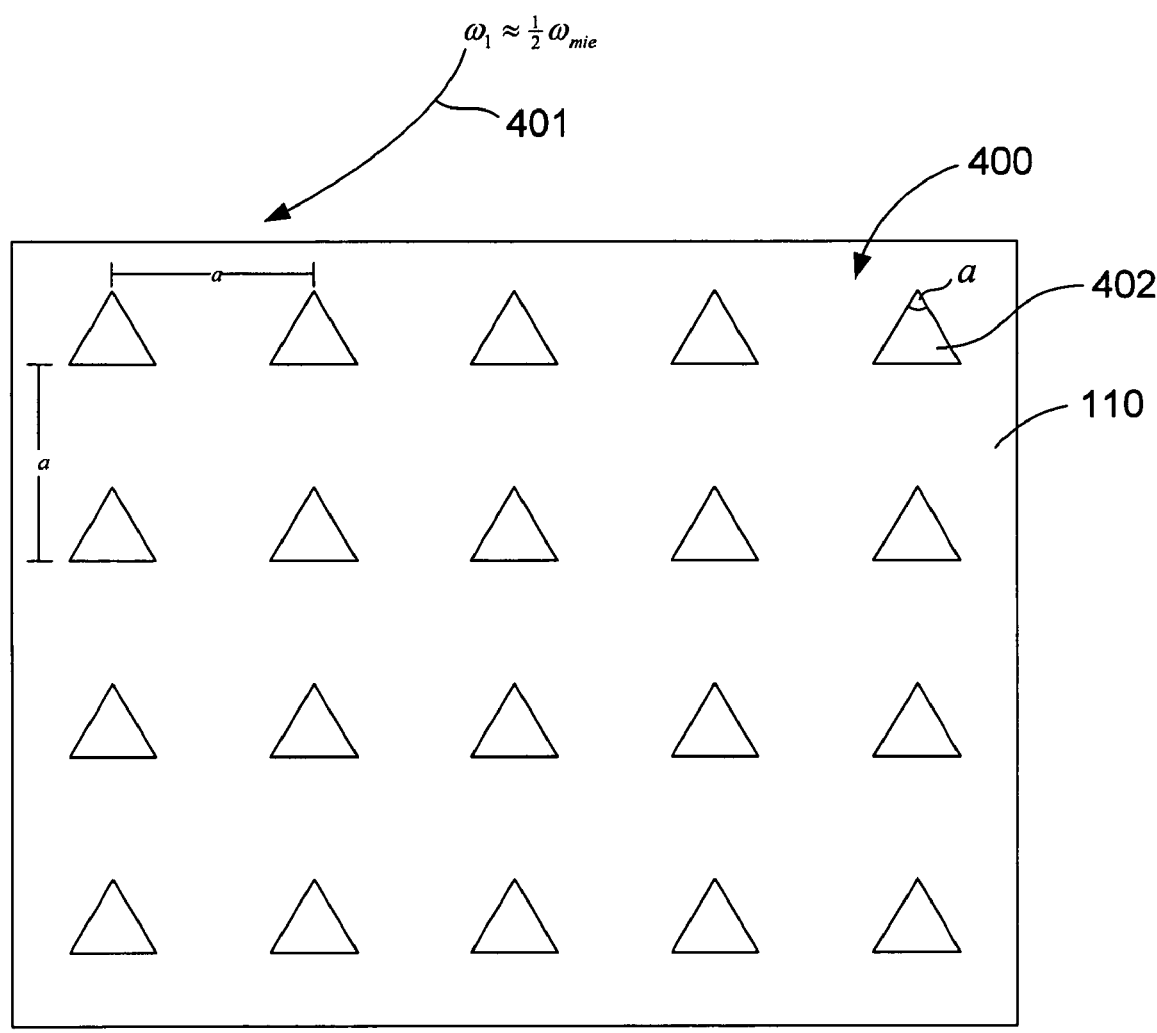
FIG. 4 is a schematic plan view of a periodic array of nanoparticles in which each of the nanoparticles lacks a center of inversion according to yet another embodiment of the present invention.

FIG. 4 shows a periodic array 400 of nanofeatures for use in a plasmonic up-converter apparatus according to another embodiment of the present invention. The periodic array 400 is configured so that an emission spectrum therefrom exhibits EMR at a second harmonic frequency $\omega_2$ with an intensity that is approximately equal to the intensity of EMR emitted at a fundamental harmonic frequency $\omega_1$. In the embodiment shown in FIG. 4, EMR 401 at an excitation frequency $\omega_1$ emitted from an excitation EMR source (not shown) for exciting the second harmonic frequency $\omega_2$ is selected to be approximately equal to one-half of the Mie resonance frequency $\omega_{mie}$ for the individual nanofeatures of the periodic array 400.

The periodic array 400 includes a number of nanoparticles 402, each of which lacks a center of inversion. In the illustrated embodiment, the nanoparticles 402 are arranged in a square lattice having a lattice constant $\alpha$. However, other periodic arrangements may be used as previously discussed with respect to the embodiments shown in FIGS. 1A through 2B. In the illustrated embodiment, each of the nanoparticles 402 has a triangular configuration. However, in other embodiments of the present invention, the nanoparticles 402 may exhibit another selected geometry that lacks a center of inversion.

Figure 5A:
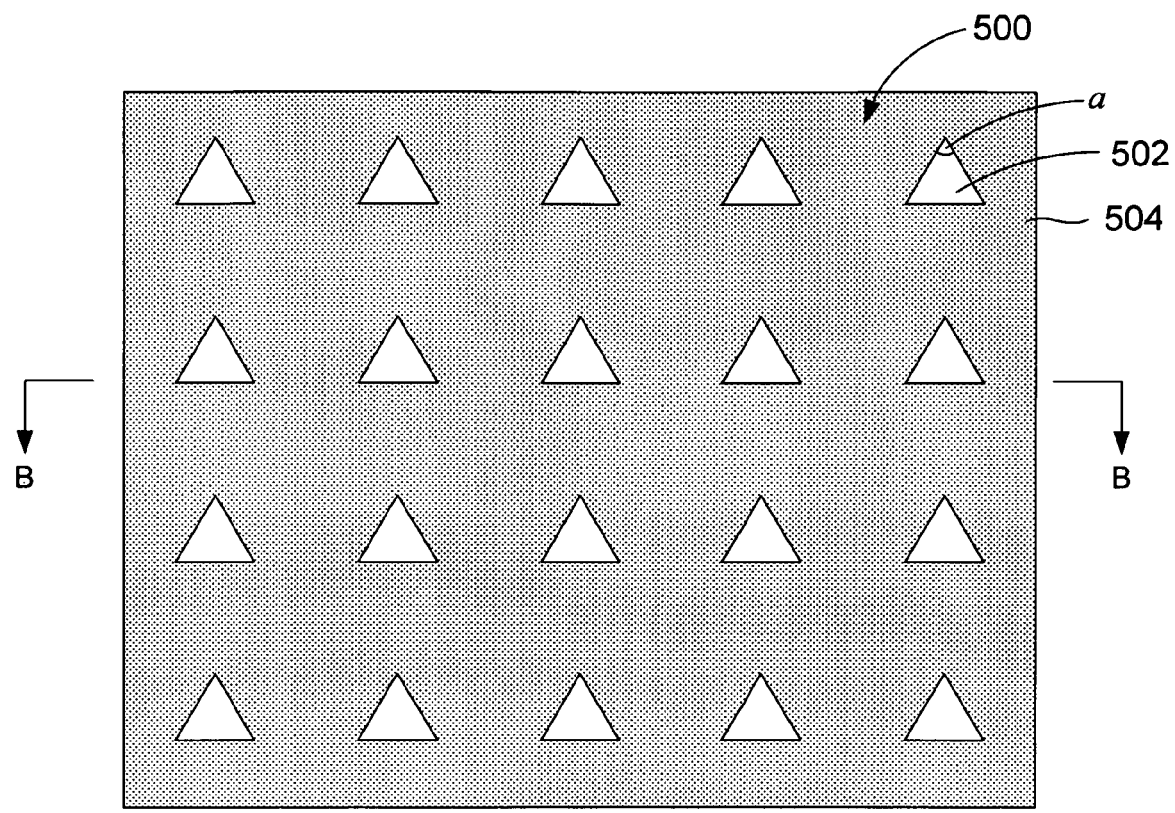
FIG. 5A is a schematic plan view of a periodic array of nanoholes in which each of the nanoholes lacks a center of inversion according to another embodiment of the present invention.
Figure 5B:
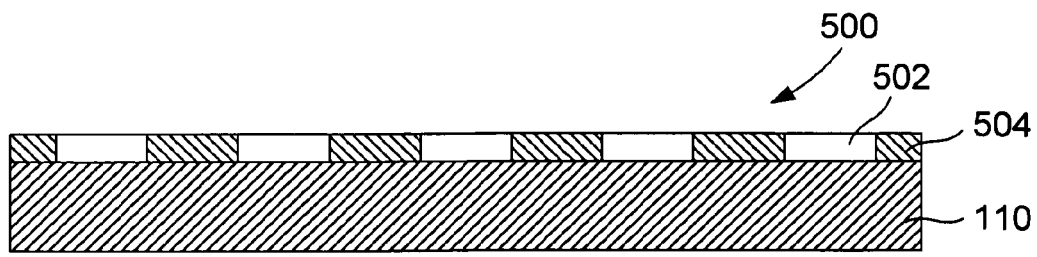
FIG. 5B is a schematic cross-sectional view of the periodic array shown in FIG. 5A taken along line B-B.

FIGS. 5A and 5B show a periodic array 500 of nanofeatures for use in a plasmonic up-converter apparatus according to yet another embodiment of the present invention. The periodic array 500 is also configured so that an emission spectrum therefrom exhibits EMR at a second harmonic frequency $\omega_2$ with an intensity that is approximately equal to the intensity of EMR emitted at a fundamental harmonic frequency $\omega_1$. The periodic array 500 includes a number of nanoholes 502, each of which lacks a center of inversion. Similarly to the periodic array 400 shown in FIG. 4, each of the nanoholes 502 may have triangular geometry or another geometry that lacks a center of inversion. The nanoholes 502 are formed in a layer 504 and each of the nanoholes 502 may extend completely, as illustrated, or partially through the thickness of the layer 504. In the illustrated embodiment, the nanoholes 502 are arranged in a square lattice having a lattice constant $\alpha$. The layer 504 may be formed from the same materials as the nanoparticles 108 shown in FIGS. 1A-1B. For example, the layer 504 may be deposited on a substrate 110 and the nanoholes 502 formed in the layer 504 using any of the previously described selective material removal methods.

Figure 6:
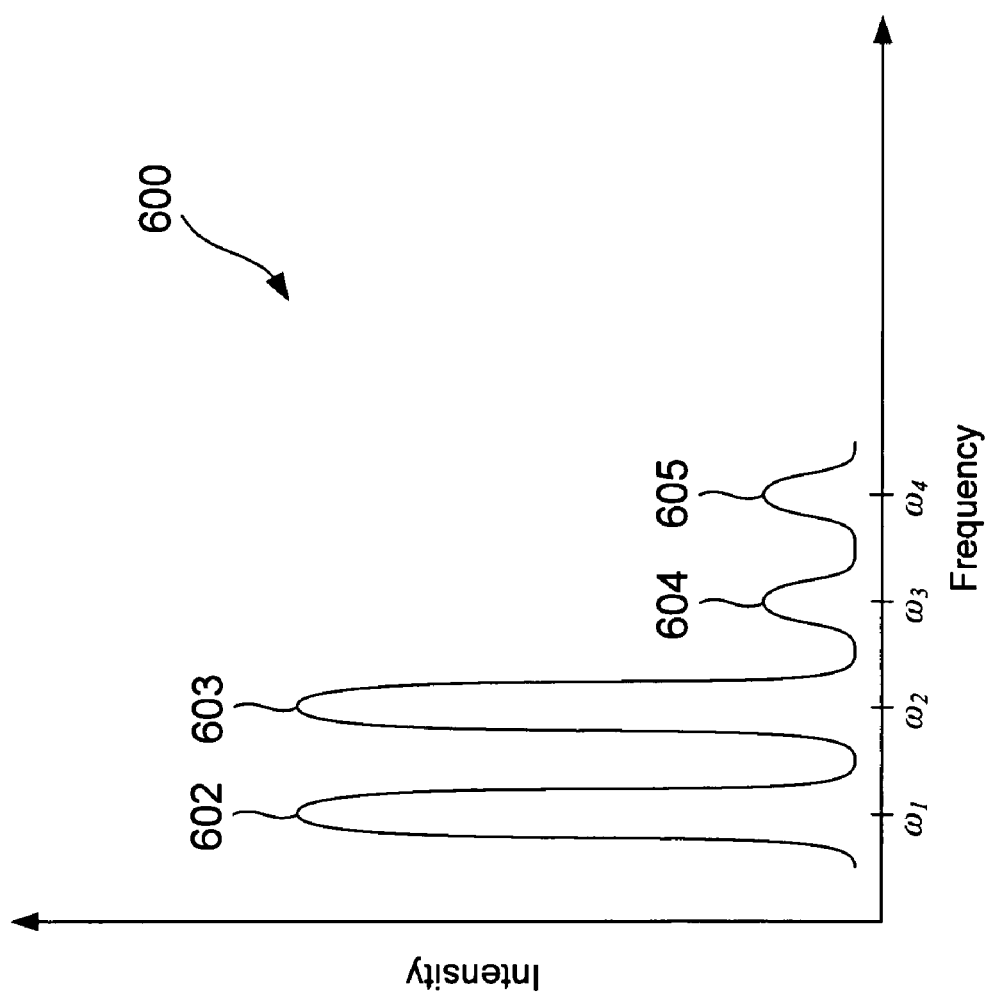
FIG. 6 is an example of an emission spectrum from one of the periodic arrays shown in FIGS. 4 through 5B in which an intensity of the second harmonic frequency is approximately equal to an intensity of a fundamental harmonic frequency.

FIG. 6 shows an emission spectrum 600 from either the periodic array 400 or 500 responsive to irradiation with EMR at a frequency $\omega_1$. Irradiation of either the periodic array 400 or 500 shown in FIGS. 4-5B with EMR at a frequency $\omega_1$ generates an EMR emission peak 602 at a fundamental harmonic frequency approximately equal to the excitation frequency $\omega_1$, an EMR emission peak 603 at a second harmonic frequency $\omega_2$, an EMR emission peak 604 at a third harmonic frequency $\omega_3$, and an EMR emission peak 605 at a fourth harmonic frequency $\omega_4$. The second harmonic frequency has a magnitude $2\omega_1$, the third harmonic frequency has a magnitude $3\omega_1$, and the fourth harmonic frequency has a magnitude $4\omega_1$. There are many additional EMR emission peaks at higher-order harmonic frequencies having a magnitude $n\omega_1$, where n is an integer, but the intensity of the EMR emission peaks at the higher-order harmonic frequencies above the third harmonic frequency typically have a relatively lower intensity compared to intensity of the EMR emission at the fundamental harmonic frequency and the third harmonic frequency.

It is noted that the second harmonic frequency $\omega_2$ and the third harmonic frequency $\omega_3$ have a frequency greater than that of the fundamental harmonic frequency $\omega_1$. Thus, the EMR at the excitation frequency $\omega_1$ is up-converted by irradiating either the periodic array 400 or 500 shown in FIGS. 4-5B with infrared or near infrared EMR in order to emit therefrom EMR at higher frequencies that fall within the visible or soft ultraviolet frequency range. For example, the second harmonic frequency $\omega_2$ has a value in the visible or soft ultraviolet frequency range. Additionally, the intensity of the EMR emission at the second harmonic frequency $\omega_2$ is approximately equal to the intensity of the EMR emission at the fundamental harmonic frequency $\omega_1$. Accordingly, in certain embodiments of the present invention about fifty percent of the excitation EMR may be up-converted to EMR at the second harmonic frequency $\omega_2$.

In a manner similar to the periodic array 106 shown in FIGS. 1A-1B and the periodic array 200 shown in FIGS. 2A-2B, the value of the second harmonic frequency $\omega_2$ may be selected by designing the nanoparticles 402 or nanoholes 502 using the formula for the Mie resonance frequency $\omega_{mie}$ discussed above. For example, the magnitude of the Mie resonance frequency $\omega_{mie}$ may be varied by varying an angle $\alpha$ of the nanoparticles 402 or nanoholes 502 shown in FIGS. 4 and 5A-5B. When the nanofeatures (e.g., the nanoparticles 402 and the nanoholes 502) lack a center of inversion, the Mie resonance frequency $\omega_{mie}$ is approximately equal to the second harmonic frequency $\omega_2$ of the emission spectrum from a periodic array of such nanofeatures. Consequently, the excitation frequency $\omega_1$ of the excitation EMR source is selected to be approximately one-half the selected Mie resonance $\omega_{mie}$.

In certain applications in may be desirable to collimate EMR emitted by any of the above described periodic arrays of nanofeatures. Accordingly, in certain embodiments of the present invention, an array of microlenses or other type of optical element may be used to collimate EMR scattered from a periodic array of nanofeatures, such as the periodic array 106, 200, 400, or 500.

Figure 7A:
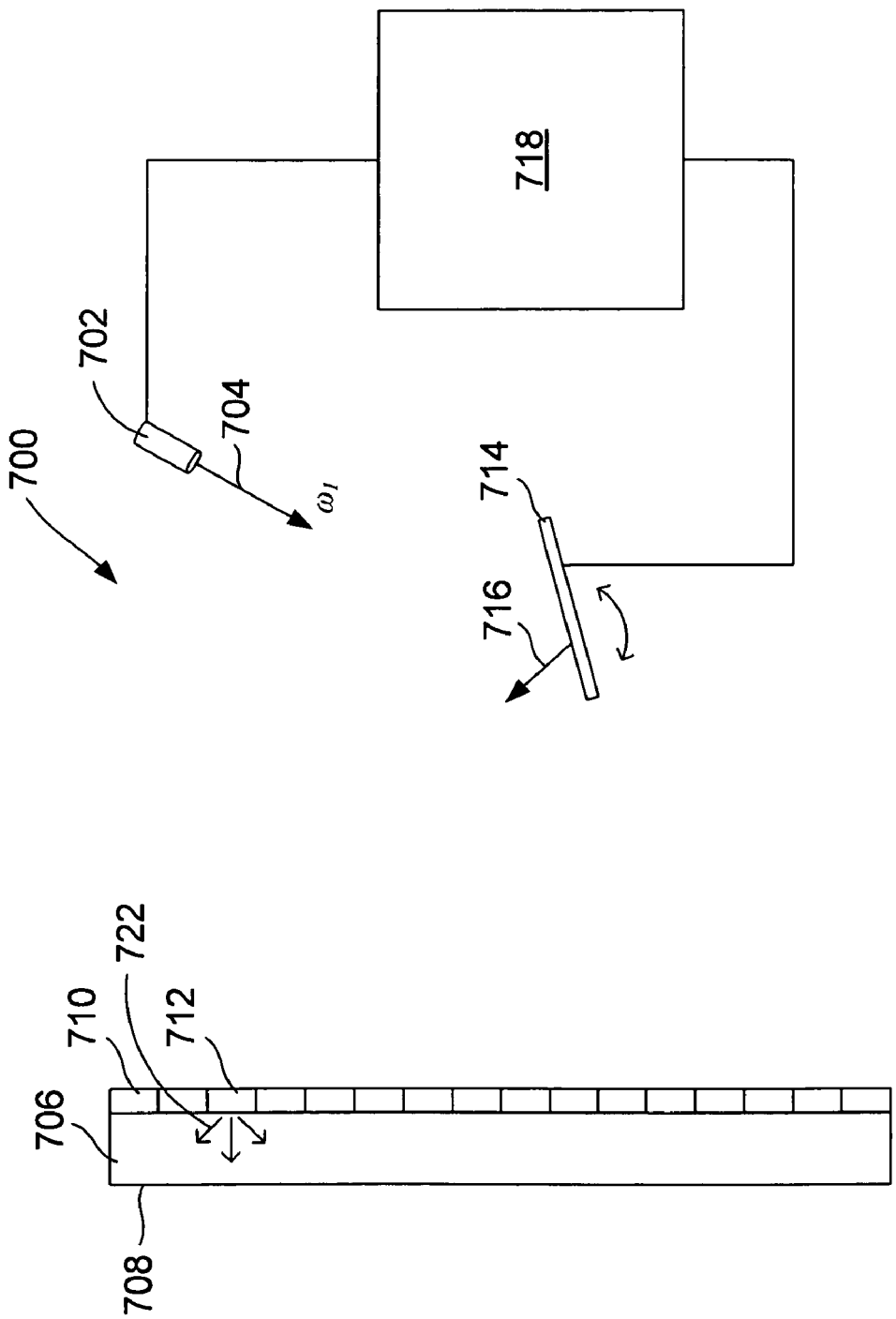
FIG. 7A is a schematic side view of a monochromatic display that incorporates any of the disclosed periodic arrays of nanofeatures according to one embodiment of the present invention.
Figure 7C:
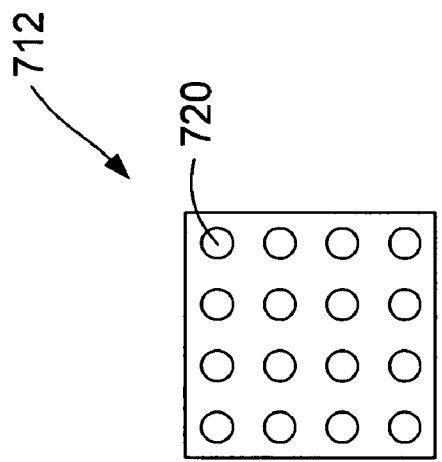
FIG. 7C is a schematic enlarged plan view of one of periodic arrays shown in FIG. 7B.
Figure 7B:
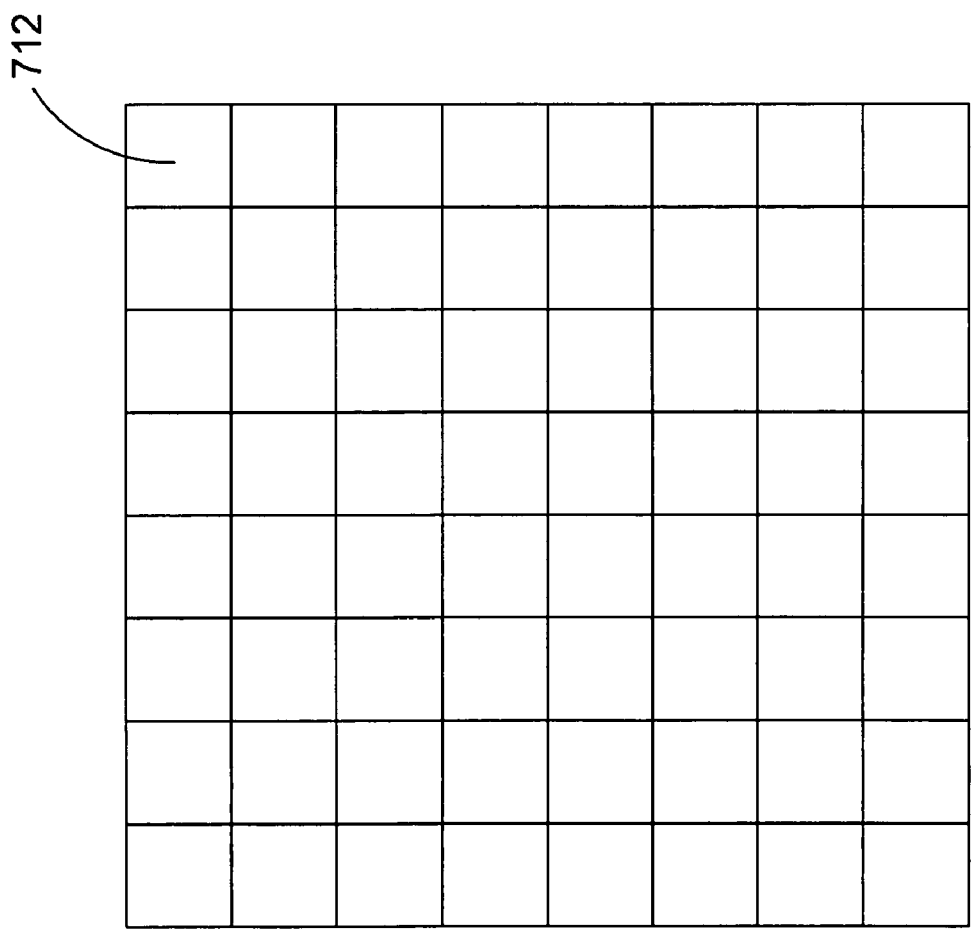
FIG. 7B is a schematic plan view of periodic arrays of nanofeatures shown in FIG. 7A.

The various embodiments for plasmonic up-converter apparatus discussed above may be utilized in a number of different display applications. FIGS. 7A-7C show a schematic diagram of a display 700 according to one embodiment of the present invention. The display 700 includes at least one excitation EMR source 702, such as an infrared laser diode. The at least one excitation EMR source 702 is configured to emit a generally collimated beam of EMR 704 at an excitation frequency $\omega_1$. The display apparatus 700 further includes an optically transparent substrate 706 having a front side 708 and an opposing back side 710. The substrate 706 may be formed from a number of different optically transparent materials, such as inorganic glasses and polymeric materials. A number of periodic arrays 712 of nanofeatures are formed on the back side 710 of the substrate 706 and function as pixel elements. The display apparatus 700 also includes a scanner 714, such as a micro-electro-mechanical scanner 714, which is rotatable to scan a beam 716 onto selected periodic arrays 712. A controller 718 is operably coupled to the scanner 714 and the at least one excitation EMR source 702, and controls the EMR emitted from the at least one excitation EMR source 702 and the scanning of the beam 716 onto the periodic arrays 712 to generate a monochromatic image that is viewable from or through the front side 708 of the substrate 706.

As shown in FIGS. 7B and 7C, each of the periodic arrays 712 may include, for example, a number of electrically conductive nanoparticles 720 arranged in a selected periodic arrangement. However, it should be emphasized that the periodic arrays 712 may be configured as any of the previously described embodiments of periodic arrays. Thus, the nanofeatures of the periodic arrays 712 may be nanoparticles, nanoholes, and the nanofeatures may have a center of inversion or lack a center of inversion depending upon which particular higher-order harmonic frequency is desired to be enhanced.

The excitation frequency $\omega_1$ emitted by the excitation EMR source 702 is selected to be either one-third or one-half the Mie resonance frequency $\omega_{mie}$ of individual nanofeatures of the periodic arrays 712. For example, when the periodic array 712 is configured as the periodic array 106 shown in FIGS. 1A-1B, the excitation frequency $\omega_1$ is chosen to be one-third of the Mie resonance frequency $\omega_{mie}$ of individual nanofeatures of the periodic array 712 (i.e., the third harmonic frequency of the emission spectrum 105). In another example, when the periodic array 712 is configured as the periodic array 400 shown in FIG. 4, the excitation frequency $\omega_1$ is chosen to be one-half of the Mie resonance frequency $\omega_{mie}$ of individual nanofeatures of the periodic array 712 (i.e., the second harmonic frequency of the emission spectrum).

In operation, according to instructions from the controller 714 (FIG. 7A), the at least one excitation EMR source 702 outputs the beam 704, which is selectively scanned by the scanner 714 as the beam 716 onto selected periodic arrays 712. As previously described, the periodic array 712 that is irradiated with the beam 716 emits EMR 722 (FIG. 7A) having an emission spectrum that includes an enhanced intensity at either a second harmonic frequency or a third harmonic frequency, within the visible frequency range, approximately equal to a fundamental harmonic frequency of the emission spectrum 720. When desired, an array of microlenses or other optical element (not shown) may be used to collimate the EMR emitted from the periodic arrays 712. Thus, by selectively irradiating the periodic arrays 712 to generate visible EMR, a monochromatic still or video image is viewable from the front side 708 of the optically transparent substrate 706. The scanner 714 may scan the beam 716 at a rate fast enough so that the image produced does not appear to be flickering. The front side 708 of the substrate 706 may be coated with a filter that substantially filters EMR of the emission spectrum 720 generated by the periodic arrays 712 that is harmful to a viewer and/or that is not at the selected visible frequency of interest. For example, the filter may be configured to substantially filter EMR 722 produced by the periodic arrays 712 that is not at or near the enhanced second harmonic frequency $\omega_2$ or the third harmonic frequency $\omega_3$.

In another embodiment of the present invention, the at least one excitation EMR source 702 may be replaced with an array of infrared laser diodes or an array of infrared LEDs. Each of the infrared laser diodes or LEDs is operable to emit a beam of EMR at the excitation frequency $\omega_1$. In such an embodiment, the scanner 714 may be omitted because each of the periodic arrays 712 has a corresponding excitation EMR source.

Figure 8A:
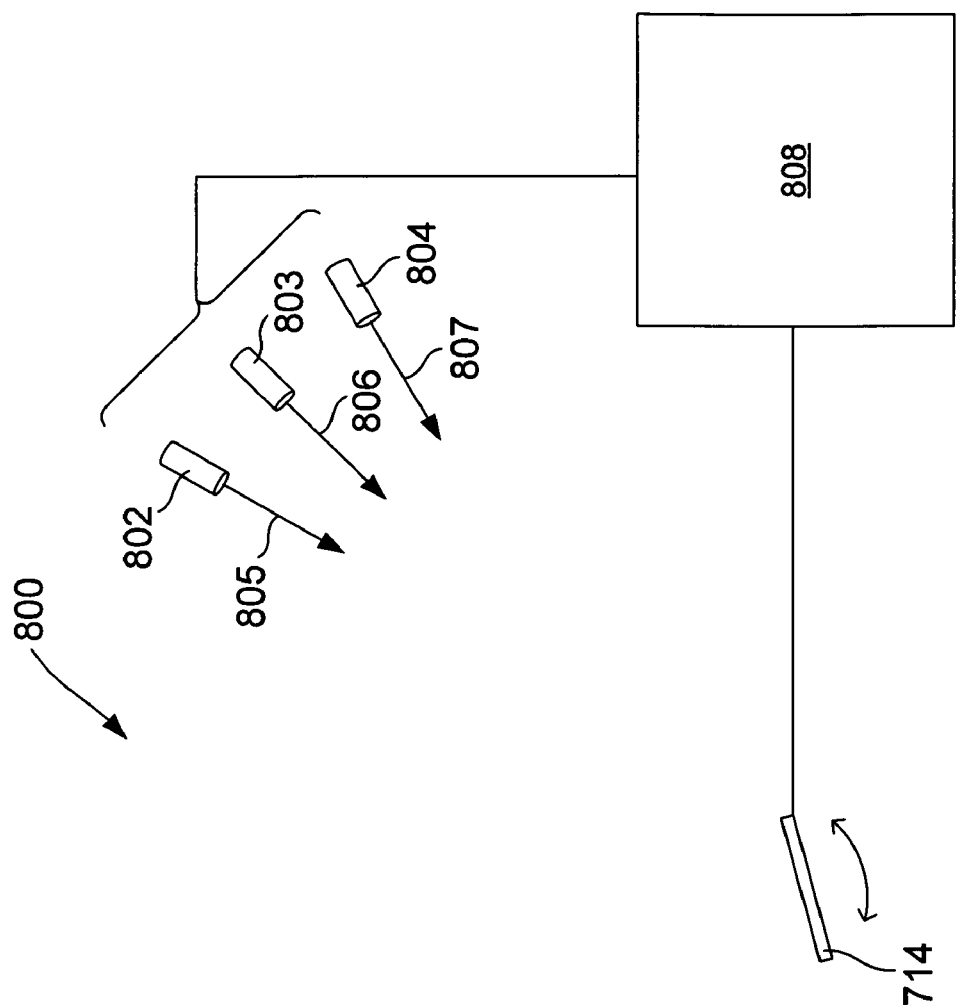
FIG. 8A is a schematic side view of a color display that incorporates any of the disclosed periodic arrays of nanofeatures according to one embodiment of the present invention.
Figure 8A:
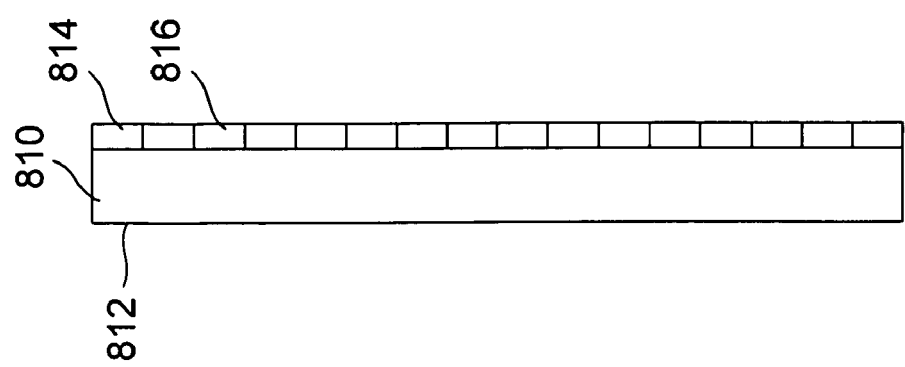
Figure 8C:
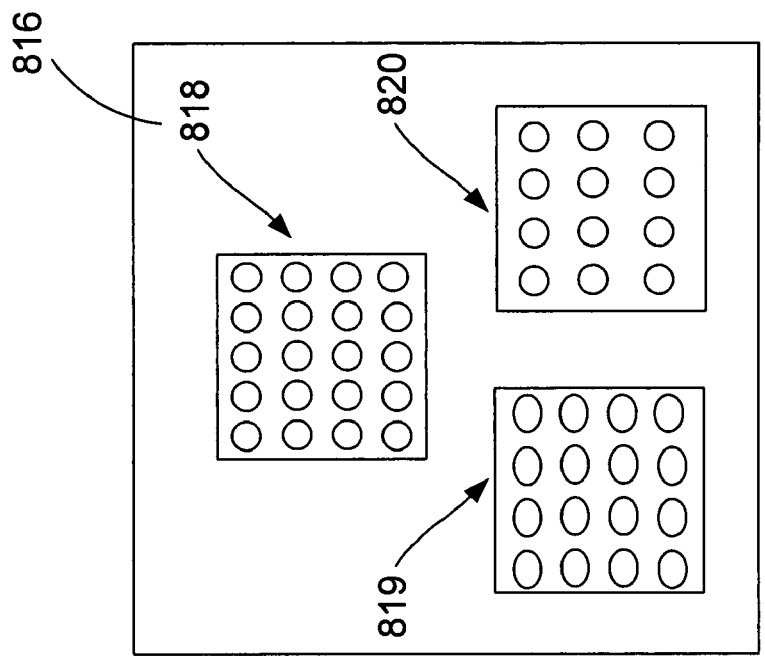
FIG. 8C is a schematic enlarged plan view of each periodic array, shown in FIG. 8B, that forms a pixel element.
Figure 8B:
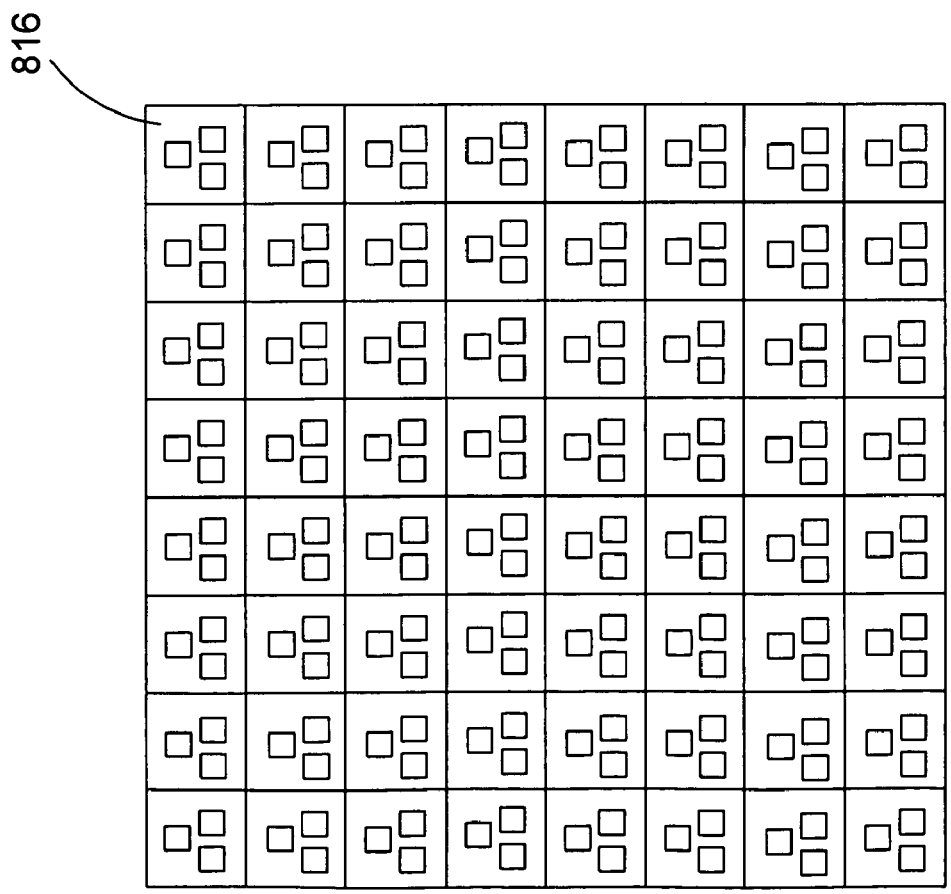
FIG. 8B is a schematic plan view of pixel elements shown in FIG. 8A.

FIGS. 8A-8C show a schematic diagram of a color display 800 according to another embodiment of the present invention. The color display 800 includes three excitation EMR sources 802-804 that are operable to emit corresponding beams 805-807 at different selected excitation frequencies. The color display 800 further includes an optically transparent substrate 810 having a front side 812 and an opposing back side 814 on which a number of pixel elements 816 are formed. As with the display 700, a scanner 714 is provided to scan the beams 805-807 onto selected pixel elements 816.

As shown in FIGS. 8B and 8C, each of the pixel elements 816 includes periodic arrays of nanofeatures 818-820. The periodic arrays of nanofeatures 818-820 may be configured as any of the previously described embodiments of periodic arrays. For example, the periodic array of nanofeatures 818 may be configured to up-convert the beam 805 to red visible light, the periodic array of nanofeatures 819 may be configured to up-convert the beam 806 to blue visible light, and the periodic array of nanofeatures 820 may be configured to up-convert the beam 807 to green visible light. The frequencies of the red-, blue-, and green-colored light are at corresponding second or third harmonic frequencies of the emission spectrum of the corresponding periodic array of nanofeatures 818-820. The particular color emitted by one of the pixel elements 816 depends upon the intensity at which the excitation EMR sources 802-804 irradiate corresponding periodic arrays 818-820 and the corresponding intensity of the red-, blue-, and green-colored light emitted from the periodic arrays 818-820 of one of the pixel elements 816. Thus, each of the periodic arrays 818-820 of a pixel element 816 functions as a plasmonic up-converter apparatus operable to up-convert infrared EMR emitted from a corresponding excitation EMR source 802-804 to a red-, green-, or blue-colored light of a selected intensity. Accordingly, under instructions from the controller 808 (FIG. 8A), a still or video color image may be generated by selecting irradiating the pixel elements 816.

Figure 9:
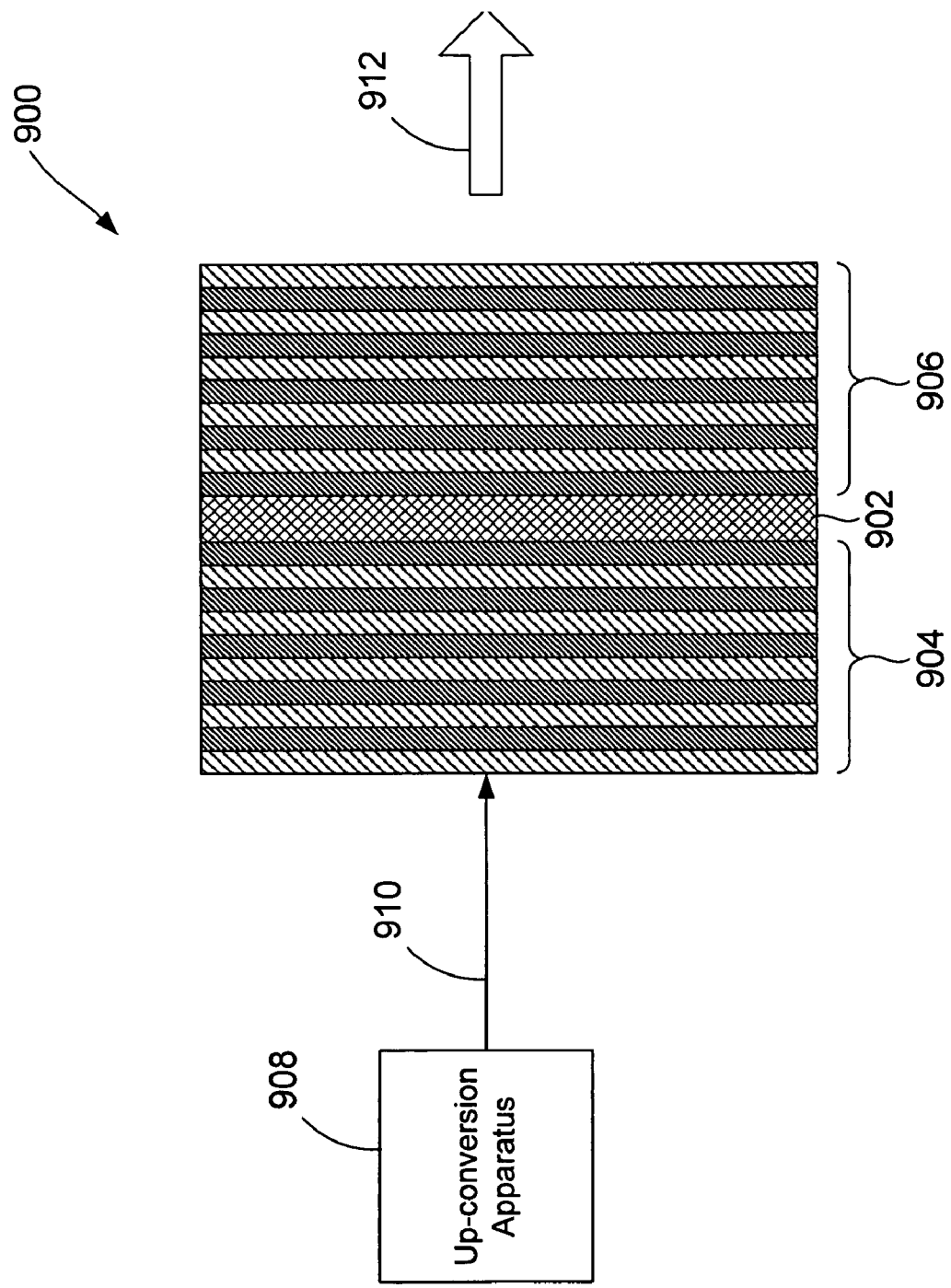
FIG. 9 is a schematic diagram of a laser that includes any of the disclosed plasmonic up-converter apparatuses for optically pumping a lasing medium according to yet another embodiment of the present invention.

The disclosed plasmonic up-converter apparatuses may also be used to optically pump a laser medium of a laser. FIG. 9 shows a laser 900 according to yet another embodiment of the present invention. The laser 900 includes a laser medium 902 positioned within a resonant optical cavity defined by partially reflective structures 904 and 906. The laser medium 902 may comprise a quantum well, quantum dots, or another suitable laser medium. The laser medium 902 may be formed from silicon carbide, diamond, gallium nitride, or another large-band gap material. The partially reflective structures 904 and 906 may be distributed Bragg reflectors ("DBRs") that are transparent to a selected frequency range of EMR. The laser 900 further includes a plasmonic up-converter apparatus 908 that may be configured as any of the disclosed plasmonic up-converter apparatus, such as the plasmonic up-converter apparatus 100 shown in FIGS. 1A-1B. The plasmonic up-converter apparatus 908 is operable to generate an emission spectrum that includes EMR 910 at a selected harmonic frequency. As previously discussed, depending on the geometry of the nanofeatures of the periodic array used in the plasmonic up-converter apparatus 908, the EMR 910 may be EMR from the emission spectrum of the periodic array at a second or a third harmonic frequency, with a magnitude that is within the visible or soft ultraviolet frequency range and an intensity approximately equal to an intensity of the fundamental frequency.

In operation, the plasmonic up-converter apparatus 908 emits the EMR 910 that is transmitted through the reflective structure 904 to optically pump the laser medium 902. The optical pumping generates a population inversion of electrons in the laser medium 902. Stimulated emission from excited electrons in the laser medium 902 is emitted, and reflected back and forth between the reflective structures 904 and 906 of the lasing cavity to generate an intense, coherent beam 912 that is transmitted through the reflective structure 906 due to the reflective structure 906 being slightly less reflective to the beam 912 than the reflective structure 904. The coherent beam 912 has a frequency within the soft ultraviolet or visible frequency range.

Although the present invention has been described in terms of particular embodiments, it is not intended that the present invention be limited to these embodiments. Modifications within the spirit of the present invention will be apparent to those skilled in the art. For example, in other embodiments of the present invention, instead of forming a periodic array of nanoparticles using a selective material removal process, nanoparticles may be formed into a periodic array by growing the nanoparticles on a substrate using a self-assembly technique, such as epitaxial growth. In addition to the up-converter apparatuses being useful in display applications and lasers, the disclosed up-converter apparatuses may be used in many other applications. In another embodiment of the present invention, the disclosed up-converter apparatuses may be used as soft ultraviolet light sources in lithography applications, such as soft UV imprint lithography systems.

The foregoing description, for purposes of explanation, used specific nomenclature to provide a thorough understanding of the present invention. However, it will be apparent to one skilled in the art that the specific details are not required in order to practice the present invention. The foregoing descriptions of specific embodiments of the present invention are presented for purposes of illustration and description. They are not intended to be exhaustive of or to limit the present invention to the precise forms disclosed. Many modifications and variations are possible in view of the above teachings. The embodiments are shown and described in order to best explain the principles of the present invention and its practical applications, to thereby enable others skilled in the art to best utilize the present invention and various embodiments with various modifications as are suited to the particular use contemplated. It is intended that the scope of the present invention be defined by the claims and their equivalents:

The invention claimed is:

1. A plasmonic up-converter apparatus, comprising:
   an excitation source operable to emit electromagnetic radiation at an excitation frequency; and
   at least one array of nanofeatures configured to produce an emission spectrum responsive to irradiation with the electromagnetic radiation, the emission spectrum having a number of distinct emission peaks, wherein a first emission peak is associated with a fundamental harmonic frequency, a second emission peak is associated with a second harmonic frequency, and a third emission peak is associated with a third harmonic frequency, the fundamental harmonic frequency approximately equal to the excitation frequency and the second and third harmonic frequencies greater than the fundamental harmonic frequency.

2. The plasmonic up-converter apparatus of claim 1 wherein each of the nanofeatures comprises a nanoparticle.

3. The plasmonic up-converter apparatus of claim 2:
wherein each of the nanoparticles has a center of inversion; and
wherein the intensity of the third emission peak at the third harmonic frequency is approximately equal to the intensity of the first emission peak at the fundamental harmonic frequency.

4. The plasmonic up-converter apparatus of claim 2:
wherein each of the nanoparticles does not have a center of inversion; and
wherein the intensity of the second emission peak at the second harmonic frequency is approximately equal to the intensity of the first emission peak at the fundamental harmonic frequency.

5. The plasmonic up-converter apparatus of claim 1 wherein each of the nanofeatures comprises a nanohole.

6. The plasmonic up-converter apparatus of claim 5:
wherein each of the nanoholes has a center of inversion; and
wherein the intensity of the third emission peak at the third harmonic frequency is approximately equal to the intensity of the first emission peak at the fundamental harmonic frequency.

7. The plasmonic up-converter apparatus of claim 5:
wherein each of the nanoholes does not have a center of inversion; and
wherein the intensity of the second emission peak at the second harmonic frequency is approximately equal to the intensity of the first emission peak at the fundamental harmonic frequency.

8. The plasmonic up-converter apparatus of claim 1 wherein the at least one array is configured so that the second harmonic frequency or the third harmonic frequency is approximately equal to a Mie resonance frequency for one of the nanofeatures.

9. The plasmonic up-converter apparatus of claim 1:
wherein the electromagnetic radiation emitted from the excitation source comprises infrared electromagnetic radiation; and
wherein at least one of the second harmonic frequency and the third harmonic frequency exhibits a magnitude within the visible or ultraviolet spectrum.

10. The plasmonic up-converter apparatus of claim 1 wherein the at least one array comprises one of:
gold;
silver;
platinum;
palladium;
aluminum;
copper; and
a doped semiconductor material.

11. A laser comprising:
a lasing cavity including a lasing medium; and
the plasmonic up-converter apparatus of claim 1, wherein the plasmonic up-converter apparatus is configured to optically pump the lasing medium using electromagnetic radiation emitted from the at least one array at the second harmonic frequency or the third harmonic frequency.

12. A display, comprising:
at least one excitation source operable to emit electromagnetic radiation at an excitation frequency; and
a number of pixel elements, each of the pixel elements including at least one array of nanofeatures configured to produce an emission spectrum responsive to irradiation with the electromagnetic radiation, the emission spectrum having a first emission peak at a fundamental harmonic frequency, a second emission peak at a second harmonic frequency, and a third emission peak at a third harmonic frequency, wherein either the intensity associated with the second emission peak or the intensity associated with the third emission peak is approximately equal to the intensity associated with first emission peak, the fundamental harmonic frequency approximately equal to the excitation frequency.

13. The display of claim 12:
wherein the at least one excitation source comprises:
a first excitation source operable to emit electromagnetic radiation at a first excitation frequency;
a second excitation source operable to emit electromagnetic radiation at a second excitation frequency; and
a third excitation source operable to emit electromagnetic radiation at a third excitation frequency;
wherein each of the arrays comprises first, second, and third arrays; and
wherein the first array is configured to up-convert the electromagnetic radiation from the first excitation source to red-colored light, the second array is configured to up-convert the electromagnetic radiation from the second excitation source to blue-colored light, and the third array is configured to up-convert the electromagnetic radiation from the third excitation source to green-colored light.

14. A method of up-converting excitation electromagnetic radiation at an excitation frequency, comprising:
irradiating at least one array of nanofeatures with the excitation electromagnetic radiation; and
emitting electromagnetic radiation from the at least one array responsive to irradiating the at least one array, the electromagnetic radiation having an emission spectrum exhibiting a number of distinct emission peaks, wherein one emission peak is associated with a fundamental harmonic frequency, a second emission peak is associated with second harmonic frequency, and a third emission peak is associated with a third harmonic frequency, the fundamental harmonic frequency approximately equal to the excitation frequency and the second and third harmonic frequencies greater than the fundamental harmonic frequency.

15. The method of claim 14, further comprising:
optically pumping a lasing device with the electromagnetic radiation at the second harmonic frequency or the third harmonic frequency.

16. The method of claim 14, further comprising:
generating an image using the electromagnetic radiation at the second harmonic frequency or the third harmonic frequency.

17. The method of claim 14, further comprising:
configuring the at least one array so that the second harmonic frequency or the third harmonic frequency is approximately equal to a Mie resonance frequency for one of the nanofeatures.

18. The method of claim 14:
wherein each of the nanofeatures has a center of inversion; and
wherein the intensity of the third emission peak at the third harmonic frequency is approximately equal to the intensity of first emission peak at the fundamental harmonic frequency.

19. The method of claim 14:

wherein each of the nanofeatures does not have a center of inversion; and wherein the intensity of the second emission peak at the second harmonic frequency is approximately equal to the intensity of first emission peak at the fundamental harmonic frequency.

20. The method of claim 14:

wherein the excitation frequency is within a frequency range for infrared electromagnetic radiation; and wherein the second harmonic frequency or the third harmonic frequency is within a frequency range for visible or ultraviolet electromagnetic radiation.

* * * * *

UNITED STATES PATENT AND TRADEMARK OFFICE
CERTIFICATE OF CORRECTION

PATENT NO. : 7,560,707 B2
APPLICATION NO. : 11/788446
DATED : July 14, 2009
INVENTOR(S) : Alexandre M. Bratkovski It is certified that error appears in the above-identified patent and that said Letters Patent is hereby corrected as shown below:

In column 4, line 27, delete "a, where a" and insert -- α, where α --, therefor.

Signed and Sealed this

Sixth Day of April, 2010

David J. Kappos
*Director of the United States Patent and Trademark Office*